US012619415B2

(12) United States Patent
Yuen et al.

(10) Patent No.: US 12,619,415 B2
(45) Date of Patent: May 5, 2026

(54) CONFIGURATION MANAGEMENT FOR NON-DISRUPTIVE UPDATE OF A DATA MANAGEMENT SYSTEM

(71) Applicant: Rubrik, Inc., Palo Alto, CA (US)

(72) Inventors: Chak Fai Yuen, Bangalore (IN); Muthugopalakrishnan Adiseshan, Bangalore (IN); Arvind Batra, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 180 days.

(21) Appl. No.: 17/948,132

(22) Filed: Sep. 19, 2022

(65) Prior Publication Data

US 2024/0095010 A1 Mar. 21, 2024

(51) Int. Cl.
| | |
|---|---|
| *G06F 9/44* | (2018.01) |
| *G06F 8/65* | (2018.01) |
| *G06F 16/182* | (2019.01) |

(52) U.S. Cl.
CPC .............. *G06F 8/65* (2013.01); *G06F 16/182* (2019.01)

(58) Field of Classification Search
CPC . G06F 8/65; G06F 8/654; G06F 8/656; G06F 8/70; G06F 8/71; G06F 16/182; G06F 16/1873
See application file for complete search history.

(56) References Cited

U.S. PATENT DOCUMENTS

| | | | | |
|---|---|---|---|---|
| 2003/0074426 A1* | 4/2003 | Dervin | ...................... | H04L 9/40 |
| | | | | 709/205 |
| 2003/0159135 A1* | 8/2003 | Hiller | .................. | G06F 9/44536 |
| | | | | 717/122 |
| 2005/0071837 A1* | 3/2005 | Butt | .......................... | G06F 8/65 |
| | | | | 717/174 |
| 2016/0291965 A1* | 10/2016 | Li | ............................ | G06F 9/445 |
| 2019/0227814 A1* | 7/2019 | Bregman | .................. | G06F 9/48 |
| 2020/0133527 A1* | 4/2020 | Zhao | ....................... | G06F 3/067 |
| 2020/0278859 A1* | 9/2020 | Olderdissen | ........ | G06F 9/45558 |
| 2022/0179765 A1* | 6/2022 | Baxter | .................. | G06F 11/301 |
| 2023/0090828 A1* | 3/2023 | Patro | .................. | H04L 41/0813 |
| | | | | 709/221 |

* cited by examiner

*Primary Examiner* — Thuy Dao
*Assistant Examiner* — Lenin Paulino
(74) *Attorney, Agent, or Firm* — Holland & Hart LLP

(57) ABSTRACT

Aspects of data management are described. Information for updating software for a data management cluster from a first version associated with a first configuration for operating multiple storage nodes of the data management cluster and a second version associated with a second configuration for operating multiple storage nodes of the data management cluster may be obtained. Based on the information, an update procedure for the data management cluster may be performed, where after a first portion of the update procedure, the first version may be installed on a first set of the storage nodes and the second version may be installed on a second set of the storage nodes. Based on storage nodes in the data management cluster having different software versions, the data management cluster may be operated using the first configuration, the second configuration, or both, during the update procedure.

20 Claims, 8 Drawing Sheets

Configuration
300-a

Configuration
300-b

Figure 8:
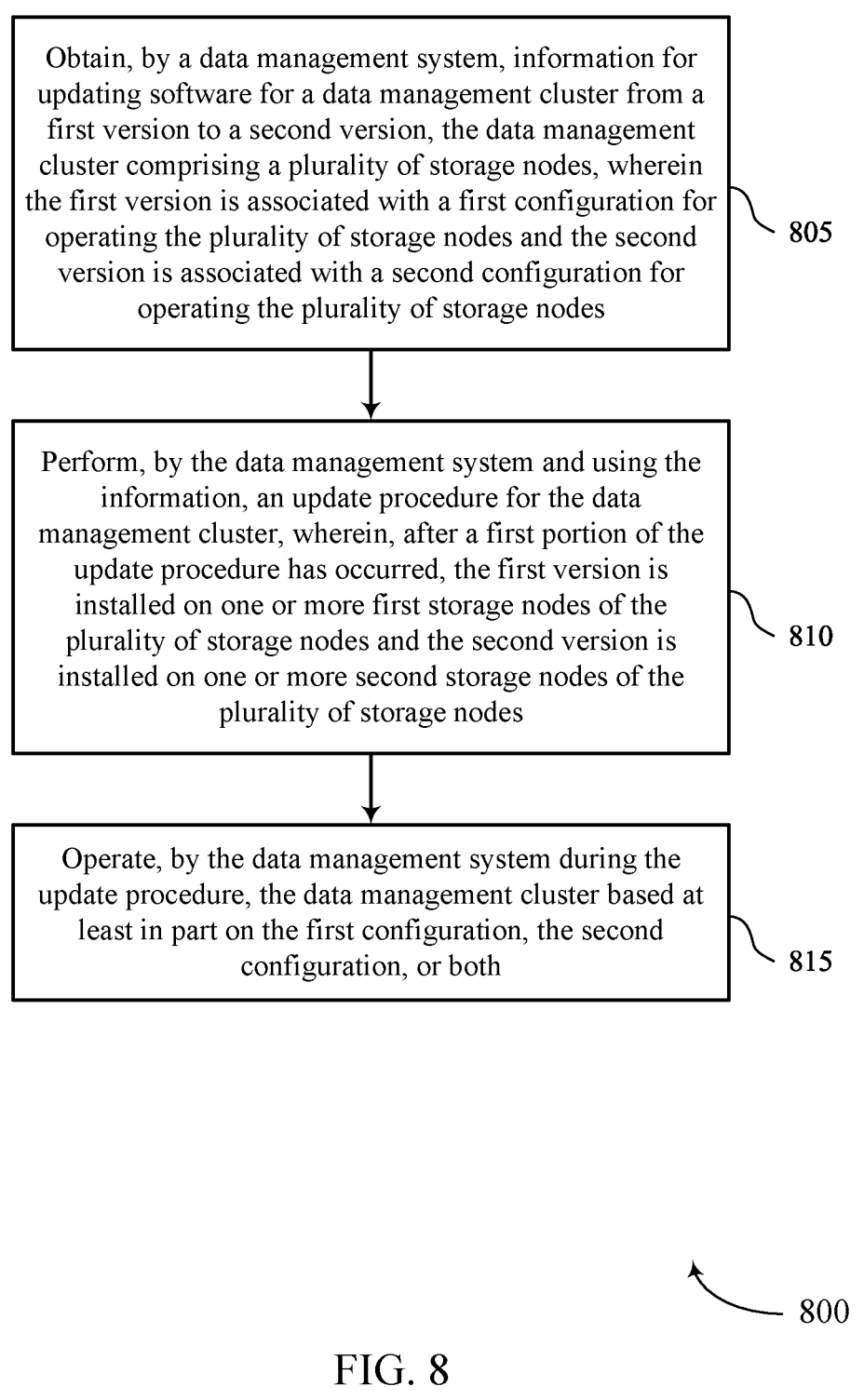

Obtain, by a data management system, information for updating software for a data management cluster from a first version to a second version, the data management cluster comprising a plurality of storage nodes, wherein the first version is associated with a first configuration for operating the plurality of storage nodes and the second version is associated with a second configuration for operating the plurality of storage nodes

805

Perform, by the data management system and using the information, an update procedure for the data management cluster, wherein, after a first portion of the update procedure has occurred, the first version is installed on one or more first storage nodes of the plurality of storage nodes and the second version is installed on one or more second storage nodes of the plurality of storage nodes

810

Operate, by the data management system during the update procedure, the data management cluster based at least in part on the first configuration, the second configuration, or both

CONFIGURATION MANAGEMENT FOR NON-DISRUPTIVE UPDATE OF A DATA MANAGEMENT SYSTEM

FIELD OF TECHNOLOGY

The present disclosure relates generally to data management, including techniques for configuration management for non-disruptive update of a data management system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 8 shows a flowchart illustrating methods that support configuration management for non-disruptive update of a data management system in accordance with aspects of the present disclosure.

DETAILED DESCRIPTION

To update the software of a cluster of storage nodes in a non-disruptive manner, an update procedure may serially update subsets (e.g., one or more) of the storage nodes.

Accordingly, the storage nodes that are not being updated may continue to support services provided by the cluster of storage nodes throughout the update procedure. Because a non-disruptive update may be used to update storage nodes (or groups of storage nodes) one-at-a-time, multiple configurations (e.g., a first configuration of a first software version and a second configuration of a second software version) may be associated with the cluster of storage nodes during an update procedure. In some examples, it may be preferred for each storage node of the cluster to operate using the same configuration (e.g., an initial configuration) during the non-disruptive update procedure—e.g., for consistency and ease of operation. In other examples, it may be preferred for updated storage nodes to operate using an updated configuration during the non-disruptive update procedure—e.g., to bring performance improvements, provide additional services, or the like.

However, permitting the updated storage nodes to use the updated configuration throughout the update (while the non-updated storage nodes use a different configuration) may result in errors during the update procedure. Accordingly, a system that enables updated storage nodes to use certain configuration parameters from the updated configuration (e.g., parameters that support performance improvements or additional services) during an update procedure may be desired.

To enable the storage nodes to use a desired set of configuration parameters while the data management cluster is being updated, configurations associated with different software versions may include an indication of whether the configuration (and/or configuration parameters of the configuration) is to be used by a storage node during an update procedure.

Figure 1:
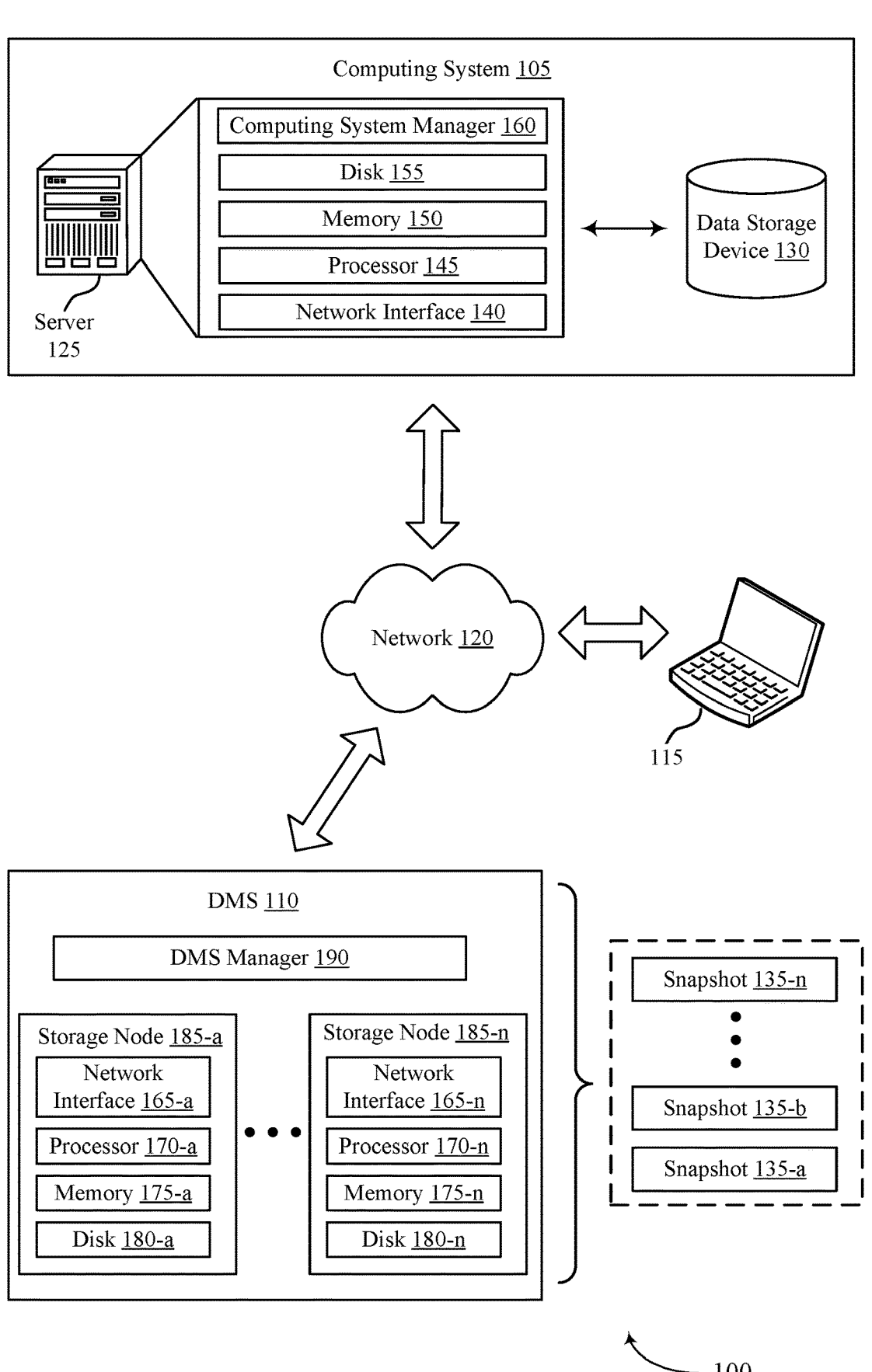
FIG. 1 shows an example of a computing environment that supports configuration management for non-disruptive update of a data management system in accordance with aspects of the present disclosure.

FIG. 1 illustrates an example of a computing environment 100 that supports configuration management for non-disruptive update of a data management system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

A storage cluster at the DMS 110 may be updated (e.g., upgraded) from a first software version to a second software version—e.g., to improve performance, stability, and/or security; to add new services; etc. As part of the procedure for updating the storage cluster, each of the storage nodes 185 may be updated from the first software version to the second software version. To perform the update procedure, each of the storage nodes may be taken offline while the update procedure is performed. A duration for performing the update procedure may last tens of minutes or hours. Accordingly, the services provided by the storage cluster may be temporarily unavailable until the update procedure is completed. An update procedure that causes the storage cluster to be taken offline may be referred to as a "disruptive" update procedure.

Alternatively, a "non-disruptive" update procedure may be performed to update the storage cluster. As part of the non-disruptive update procedure, individual (or groups of) storage nodes may be updated from the first software version to the second software version (e.g., on a serial or one-by-one basis). A procedure for serially updating the storage nodes may be referred to as a rolling update procedure. Accordingly, the storage cluster may continue to provide services (remain online) throughout the update procedure. That is, the storage nodes not being currently updated may be used to support the services provided by the storage cluster. Since a non-disruptive update procedure may involve individually updating the storage nodes 185 (or groups of the storage nodes 185), a duration for performing the non-disruptive update procedure may last hours or days. For example, the duration of the non-disruptive update procedure may include the collective time of individually updating each of the storage nodes 185.

In some examples, the DMS manager 190 (or a "driving storage node" of the storage nodes 185 that is designated as the driving node for the update procedure) may obtain information for updating a software of the storage nodes 185 from a first version to a second version. The first version may be associated with a first configuration for operating the storage nodes 185, and the second version may be associated with a second configuration for operating the storage nodes 185. The DMS manager 190 (or the driving storage node) may use the information to perform an update procedure for the storage nodes 185. After a first portion of the update procedure has completed, the first version may remain installed on a first set of the storage nodes 185, and the second version may be installed on a second set of the storage nodes 185. Thus, the software installed on the first set of the storage nodes 185 may be associated with the first configuration, and the software installed on the second set of the storage nodes 185 may be associated with the second configuration. Therefore, during the update procedure, the storage nodes 185 may operate based on the first configuration, the second configuration, or both.

That is, in some examples, during the update procedure, the first set of storage nodes may operate using the first configuration, and the second set of storage nodes may operate using the second configuration. In other examples, during the update procedure, the first set of storage nodes may operate using the first configuration, while the second set of storage nodes may operate using first configuration parameters from the first configuration and second configuration parameters from the second configuration—e.g., to avoid errors being caused during the update procedure by different storage nodes using different configuration parameters for certain configuration parameters. At a completion of the update procedure and once all of the storage nodes 185 have been updated, each of the storage nodes 185 may operate using the second configuration.

Figure 2:
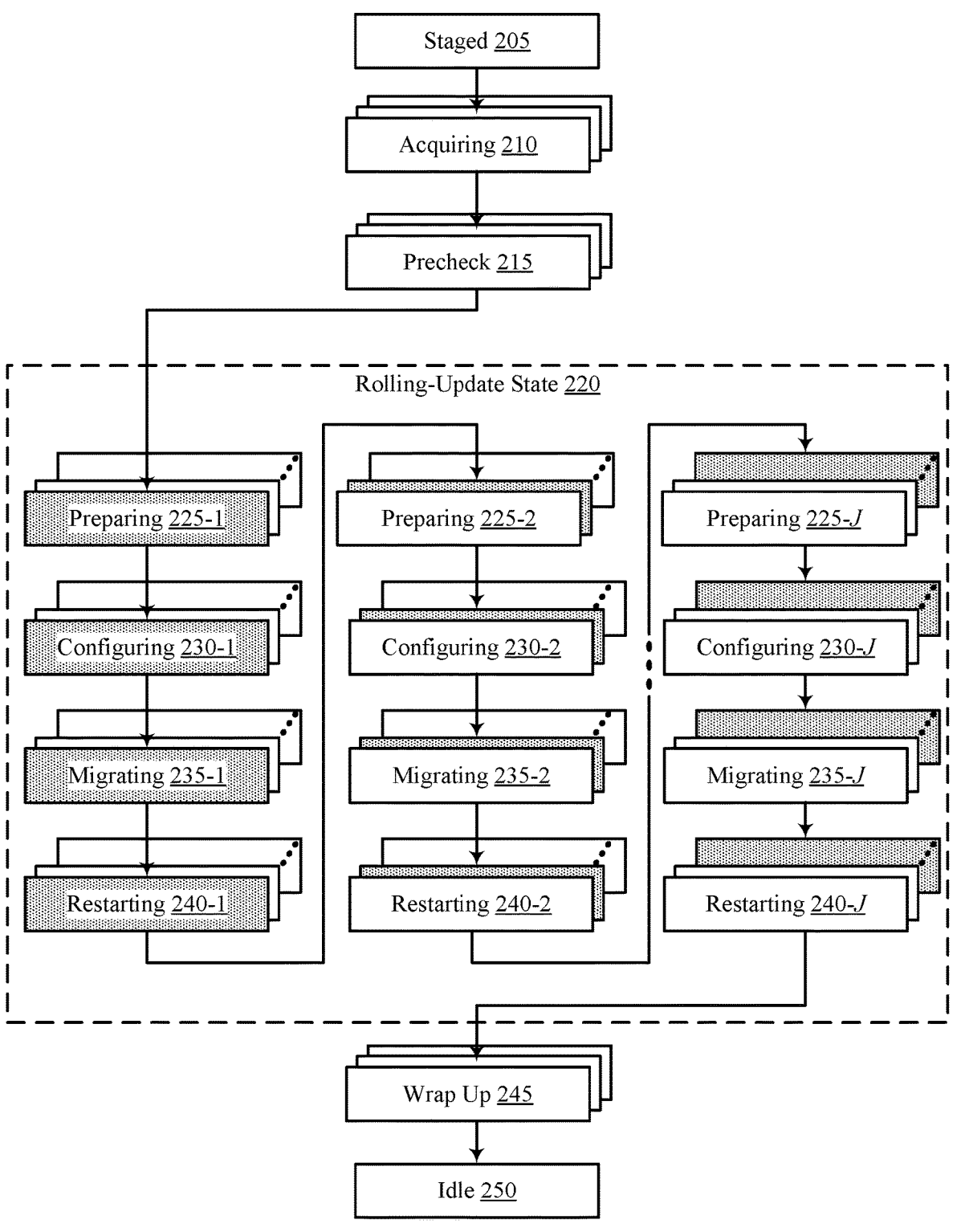
FIG. 2 illustrates an example of a state diagram that supports configuration management for non-disruptive update of a data management system in accordance with aspects of the present disclosure.

FIG. 2 shows an example of a state diagram that supports configuration management for non-disruptive update of a data management system in accordance with examples as disclosed herein.

The state diagram 200 may depict the different states of a data management cluster during a non-disruptive update procedure. The state diagram 200 may include cluster-wide states that include first tasks that are performed on the storage nodes collectively, and node-level tasks that are performed on storage nodes individually. The state diagram 200 may depict the operation of a cluster-wide state machine associated with the data management cluster as well as one or more nested node-level state machines associated with the storage nodes. A nested node-level state machine may also be referred to as a rolling update (RU) state machine.

Based on receiving an indication that an update for the data management cluster is available, the cluster-wide state machine and the data management cluster may enter the staged state 205. Based on entering the staged state 205, the data management cluster may be ready for a procedure for non-disruptively updating the data management cluster from a first software version to a second software version to be initiated. In some examples, prior to entering the staged state 205, the data management cluster may download the update and confirm an integrity of the update, for example. In some examples, each storage node in the data management cluster may concurrently (e.g., simultaneously) transition to the staged state 205 together.

After the staged state 205 is entered and the rolling update is initiated, the cluster-wide state machine and data management cluster may enter the acquiring state 210. Based on entering the acquiring state 210, the data management cluster may acquire an update-lock protecting the data management cluster from changes that would interfere with the rolling update process. In some examples, each storage node in the data management cluster may concurrently (e.g., simultaneously) transition to the acquiring state 210 together.

In some examples, before proceeding with the rolling update, the cluster-wide state machine and the data management cluster may enter the precheck state 215. While in the precheck state 215, the data management cluster may perform one or more checks to determine whether to proceed with the rolling update. In some examples, the data management cluster performs one or more cluster-wide (or system-wide) checks to determine whether to proceed with the rolling update. Additionally, or alternatively, the data management cluster may perform one more individual node-level checks to determine whether to proceed with the rolling update. In some examples, a deploying state may be inserted between the acquiring state 210 and the precheck state 215. The deploying state may be used to deploy the update to the storage nodes.

Based on passing the prechecks and/or addressing any outstanding items raised by the prechecks, a status of the storage nodes may be set to OK (which may indicate to the services being run by the data management cluster that the storage node is available to support the services), and the cluster-wide state machine and the data management cluster may enter the rolling update state 220. Based on entering the rolling update state 220, a plan for updating the data management cluster may be determined. For example, the plan may designate an order for updating the storage nodes (e.g., individually or in groups). Also, a node-level finite state machine (which may be referred to as a state machine) may be instantiated. In some examples, a state machine is instantiated for each storage node (e.g., of N storage nodes) or for sets of the storage nodes in the data management cluster. Though, in some examples, the state machines may be instantiated prior to entering the rolling update state 220 (e.g., when the staged state 205 is entered). Based on instantiating the state machines, the states of the state machines and state handlers for the various states may be established.

The states of the individual state machines may be represented by the overlaid boxes, such that the frontmost boxes may correspond to a first state machine for a first storage node, the intermediary boxes may correspond to a second state machine for a second storage node, and the backmost boxes may correspond to a third state machine for an Nth storage node. Each state machine may include a preparing state, a configuring state, a migrating state, and a restarting state. In some examples, each state machine may also include a done state to indicate that the update at a corresponding node is complete.

The state machines may perform the tasks of some states in parallel. That is, the storage nodes may perform the tasks of some states concurrently—e.g., one or more tasks of the preparing state. While the tasks of other states may be performed serially. That is, the storage nodes may not perform certain tasks until certain tasks are completed by a particular storage node—e.g., one storage node may not perform the tasks of the configuring, migrating, and restarting states until a particular storage node completes the tasks of the configuring, migrating, and restarting states; another storage node may not perform the tasks of the configuring, migrating, and restarting states until the one storage node completes tasks of the configuring, migrating, and restarting states, and so on. In some examples, which tasks are performed by the storage nodes serially or in parallel may be modified by modifying the operation of the individual nested state machines. In some examples, for each task performed for a state machine, a file may be updated before and after the task is performed to record the current state and quantity of tasks performed by each node. After completing the tasks of a current state, a state machine may proceed to the next state. In some examples, if the state machine encounters an error, the state machine, the rolling update, or both, may be paused.

After the rolling update state 220 is entered and the state machines are instantiated, a first state machine at the first storage node may enter the preparing state. In some examples, based on entering the first preparing state 225-1, the first storage node corresponding to the first state machine may stop providing services and identify ongoing jobs for the services. Also, a status of the first storage node may be set to UPDATE (to indicate that the first storage node is being updated). In some examples, the first storage node may perform a quick reboot. While the first storage node is in the first preparing state 225-1, a status of the other storage nodes corresponding to the other state machines may be set to OK. While the OK status is set, the other storage nodes may continue to execute ongoing jobs to support services provided by the data management cluster.

The first state machine and the first storage node may then proceed to the first configuring state 230-1. While in the first configuring state 230-1, the first storage node may configure a secondary partition with system settings, apply platform specific changes, and perform a regular reboot. In some examples, the first storage node may make additions and/or modifications to the configuration of an operating system of the first storage node, the data management software of the first storage node, or both. In some examples, the first storage node may make additions and/or modifications to the configuration of virtual machines, physical machines, or both. A configuration may include configuration parameters, where each configuration parameter may have a specified value.

Based on updating the configurations, the first state machine and the first storage node may then proceed to the first migrating state 235-1. While in the first migrating state 235-1, the first storage node may prepare the updated software version for operation. For example, the first storage node may convert existing data into different forms; populate, modify, or remove a schema added in the updated software version; populate, modify, or remove entries of a schema modified in the updated software versions; and the like.

After initializing the updated software version, the first state machine and first storage node may enter the first restarting state 240-1. While in the first restarting state 240-1, the first storage node may restart itself—e.g., so that the first storage node (the services provided by the first storage node) may begin operating in accordance with the updated software version. In some examples, after successfully restarting, the first state machine and the first storage node may transition to a done state and a status of the first storage node may be reset to OK.

Based on the first storage node successfully restarting, a next state machine and a next storage node may enter and perform the tasks of the second preparing state 225-2. Also, a status of the next storage node may be set to UPDATE. After completing the tasks of the second preparing state 225-2, the next state machine and the next storage node may proceed through the second configuring state 230-2, the second migrating state 235-2, and the second restarting state 240-2 of the second state machine, as similarly described with reference to the first storage node. Based on the next storage node successfully restarting, a following state machine and following storage node may proceed through the tasks of the preparing and subsequent states. And so on—e.g., until all of the storage nodes have been updated.

Based on a last storage node (e.g., the $J^{th}$ storage node 225-J) exiting the last restarting state (e.g., the $J^{th}$ restarting state 240-J), the cluster-wide state machine may proceed to the wrap-up state 245. In some examples, the P storage node 225-J is the storage node that drives the rolling update procedure (and may be referred to as the driving node). While in the wrap-up state 245, certain data in the storage nodes may be deleted (e.g., cleaned-up)—e.g., data that is preferable not to delete during the rolling update, such as old or obsolete metadata, system configurations, and the like. In some examples, destructive schema changes may also be performed while in the wrap-up state. Additionally, an update status of OK may be designated for the data management cluster (to indicate that the rolling update was completed successfully). After completing the wrap-up operations, the cluster-wide state machine may proceed to the idle state 250.

In some examples, a first software version may be associated with a first configuration (e.g., a first set of configuration parameters with first values), and a second software version may be associated with a second configuration (e.g., a second set of configuration parameters with second values). The first configuration and the second configuration may share common configuration parameters. In some examples, a value of one or more of the configuration parameters of the second software version may be modified relative to the first software version. Additionally, or alternatively, the first configuration and the second configuration may include different configuration parameters. For example, one or more configuration parameters in the first configuration may be omitted from the second configuration, one or more configuration parameters (not in the first configuration) may be added to the second configuration, or both.

Because the non-disruptive update is used to update storage nodes (or groups of storage nodes) one-at-a-time, multiple configurations (e.g., a first configuration of a first software version and a second configuration of a second software version) may be associated with the data management cluster during an update procedure. In some examples, it may be preferred for each storage node of the data management cluster to operate using the same configuration (e.g., the first configuration) during the update procedure—e.g., for consistency and ease of operation. In other examples, it may be preferred for updated storage nodes to operate using an updated configuration (e.g., the second configuration, or a combination of the first configuration and the second configuration) during the update procedure—e.g., to bring performance improvements (e.g., lower latency, lower power consumption, etc.), provide additional services, or the like.

To enable the storage nodes to use a desired set of configuration parameters (from the first configuration, the second configuration, or a combination thereof) while the data management cluster is being updated, configurations (and/or configuration parameters) may include an indication of whether the configuration (and/or a configuration parameter) is to be used by a storage node during an update procedure.

In some examples, the data management cluster may obtain information for updating software for a data management cluster that includes multiple storage nodes. The information may be for updating the data management cluster from a first software version that is associated with a first configuration for operating the plurality of storage nodes to a second software version that is associated with a second configuration for operating the plurality of storage nodes. Based on obtaining the update information, the data management cluster may perform an update procedure (e.g., a non-disruptive update procedure) for the data management cluster. After a first portion of the update procedure has occurred, the first software version may be installed on a first set of the storage nodes and a second software version may be installed on a second set of the storage nodes. During the update procedure, the data management cluster may operate the data management cluster using the first configuration of the first software version, the second configuration of the software version, or both.

By operating the data management cluster using the first configuration for all of the storage nodes during the update procedure, a data management cluster with differently versioned nodes may be operated with increased stability and reduced complexity.

By operating the data management cluster using the first configuration for non-updated storage node and the second configuration for updated storage nodes, a data management cluster may more quickly realize benefits of the updated software version, such as an improved performance or the ability to offer new services.

Figure 3A:
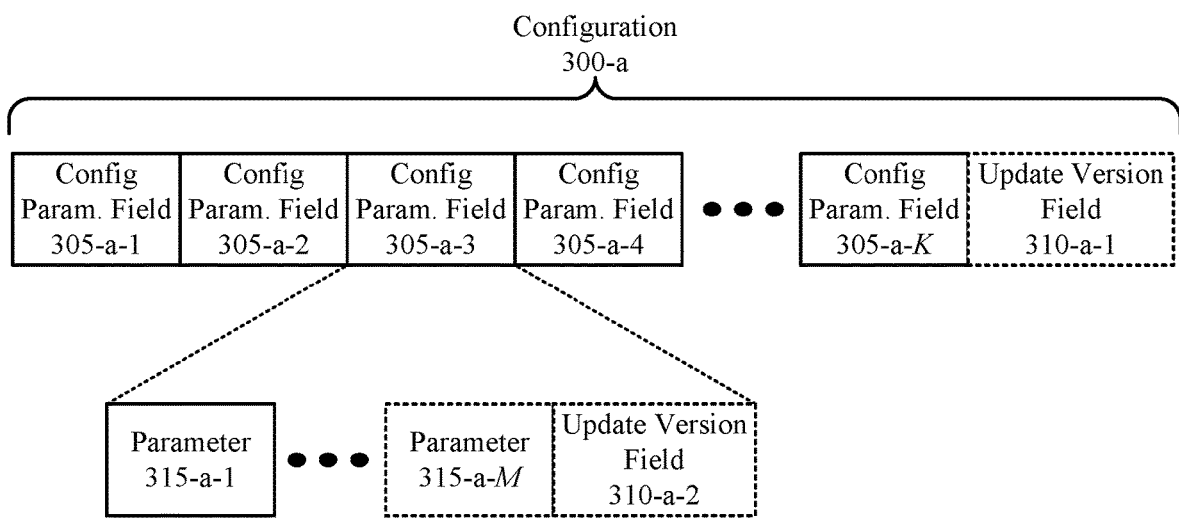
FIGS. 3A and 3B illustrate examples of configurations that support configuration management for non-disruptive update of a data management system in accordance with aspects of the present disclosure.

FIG. 3A shows an example of a configuration that supports configuration management for non-disruptive update of a data management system in accordance with examples as disclosed herein.

The configuration 300-a may be an initial configuration used by the storage nodes in a data management cluster and that is associated with a first software version installed on the storage nodes. The configuration 300-a may include a set of configuration parameters (included in the configuration parameter fields 305-a). The configuration 300-a may also include a first update version field 310-a-1.

A configuration parameter field of the configuration parameter fields 305-a may be used to indicate values for one or more configuration parameters of the configuration 300-a—e.g., for a particular setting or service. In some examples, a configuration parameter field of the configuration parameter fields 305-a may also indicate whether non-updated configuration parameters or updated configuration parameters indicated in the configuration parameter field is to be used by a storage node during an update procedure. For example, the third configuration parameter field 305-a-3 may include values for the set of parameters 315-a as well as the second update version field 310-a-2.

The second update version field 310-a-2 may indicate that the values for the s parameters indicated in the third configuration parameter field 305-a-3 are to be used by all of the storage nodes throughout an update procedure—e.g., if a value of the second update version field 310-a-2 indicates a Cluster Version setting. Alternatively, the second update version field 310-a-2 may indicate that different values for the parameters (e.g., the values indicated in the third configuration parameter field 305-b-3 of FIG. 3B) are to be used by updated storage nodes during the update procedure—e.g., if a value of the second update version field 310-a-2 indicates a Node Version setting.

The first update version field 310-a-1 may indicate whether a non-updated configuration or an updated configuration is to be used by a storage node during an update procedure. For example, the first update version field 310-a-1 may indicate that the configuration 300-a is to be used by all of the storage nodes throughout an update procedure—e.g., if a value of the first update version field 310-a-1 indicates a Cluster Version setting. Alternatively, the first update version field 310-a-1 may indicate that a new configuration (e.g., the configuration 300-b of FIG. 3B) is to be used by updated storage nodes during the update procedure—e.g., if a value of the first update version field 310-a-1 indicates a Node Version setting.

In some examples, a Cluster Version setting may be indicated by a 0 value and a Node Version setting may be indicated by a 1 value. In some examples, additional settings (e.g., Intermediary Version) may be indicated by other values. In some examples, the first update version field 310-a-1 and the second update version field 310-a-2 may include a first parameter for indicating an update version setting when a data management cluster is updated directly from a first software version to a second software version and a second parameter for indicating an update version setting when a data management cluster is updated from a first software version to a third software version in a process that includes an intermediary update from the first software version to a second software version.

In some examples, the configuration 300-a is represented using a scheme. For example, an example schema for the configuration 300-a may be represented by the following schema. The following schema may include an indication of whether to use a Cluster Version or Node Version for each configuration parameter of the configuration 300-a.

```
{
    Config Param. 1
    {
        Setting 1: 0x00
        Setting 2: 0x11
        ...
        Setting S₁: 0x11
        Update Version: 0x01
    }
    ...
    Config Param. P₁
    {
        Setting 1: 0x10
        ...
        Setting S₂: 0x11
        Update Version: 0x00
    }
}
```

-continued

```
                              }
```

In another example, an example schema for the configuration 300-*a* may be represented by the following schema. The following schema may include an indication of whether to use a Cluster Version or Node Version for the configuration 300-*a* as a whole.

```
{
    Config Param. 1
    {
        Setting 1: 0x00
        Setting 2: 0x11
        ...
        Setting S₁: 0x11
    }
    ...
    Config Param. P₂
    {
        Setting 1: 0x10
        ...
        Setting S₂: 0x11
    }
    Update Version: 0x01
}
```

In some examples, an example schema may include an indication of whether to use a Cluster Version or Node Version for groups of configuration parameters of the configuration 300-*a*. In some examples, an example schema may include an indication of whether to use a Cluster Version or Node Version for the configuration 300-*a* as a whole as well as an indication of whether to use an opposing Cluster Version or Node Version for particular configuration parameters (or groups of configuration parameters) of the configuration 300-*a*.

Figure 3B:
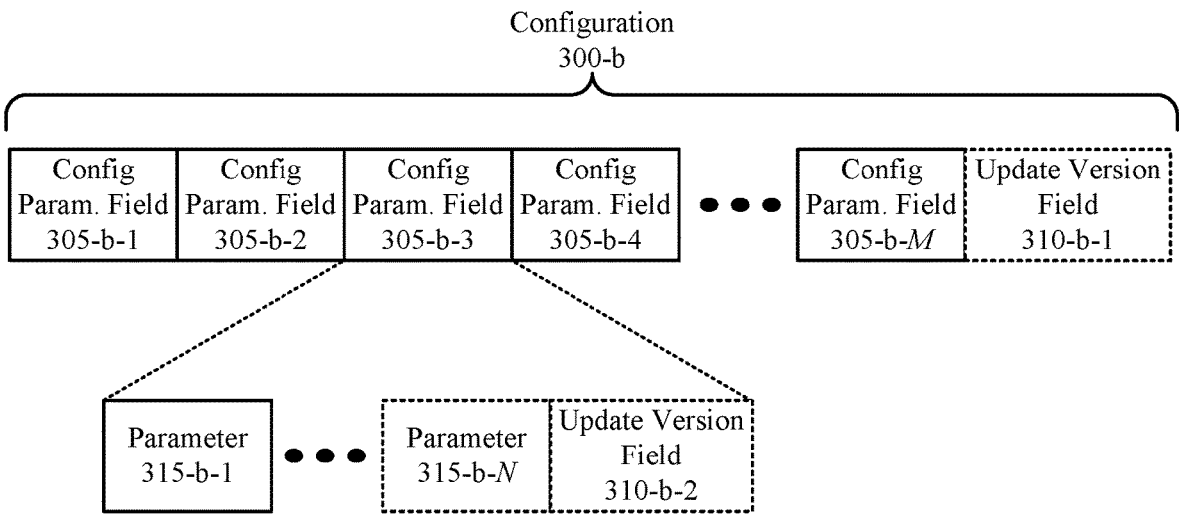

FIG. 3B shows an example of a configuration that supports configuration management for non-disruptive update of a data management system in accordance with examples as disclosed herein.

The configuration 300-*b* may be a new configuration associated with a second software version to be installed on the storage nodes of the data management cluster. The configuration 300-*b* may be configured similarly to the configuration 300-*a* of FIG. 3A. In some examples, the configuration 300-*b* may include a different set of configuration parameter fields 305-*b* than the configuration 300-*a*. For example, in addition to the configuration parameter fields 305-*a*, the configuration 300-*b* may include new configuration parameter fields 305-*b*. Additionally, or alternatively, the configuration 300-*b* may omit one or more of the configuration parameter fields 305-*a*.

Similarly, for common configuration parameter fields, the configuration parameter fields 305-*b* may be configured differently than the configuration parameter fields 305-*a*. For example, the third configuration parameter field 305-*b*-3 may include a different set of parameters 315-*b* than the third configuration parameter field 305-*a*-3 of FIG. 3B. For example, in addition to the parameters 315-*a*, the configuration 300-*b* may include new parameters 315-*b*. Additionally, or alternatively, the configuration 300-*b* may omit one or more of the parameters 315-*a*. For common parameters across common configuration parameter fields, a value of the common parameters may be different in the different configurations. For example, the first parameter 315-*b*-1 and the first parameter 315-*a*-1 of FIG. 3A may be common, and a value of the first parameter 315-*b*-1 may be different than a value of the first parameter 315-*a*-1.

As similarly described with reference to the configuration 300-*a*, the configuration 300-*b* may include first update version field 310-*b*-1, which may indicate whether the configuration 300-*b* or an earlier configuration (e.g., the configuration 300-*a*) is to be used by a storage node during an update. For example, the first update version field 310-*b*-1 may indicate that the earlier configuration-a is to be used by all of the storage nodes throughout an update procedure—e.g., if a value of the first update version field 310-*b*-1 indicates a Cluster Version setting. Alternatively, the first update version field 310-*b*-1 may indicate that the configuration 300-*b* is to be used, during the update procedure, by storage nodes that have been updated to the software version associated with the configuration 300-*b*—e.g., if a value of the first update version field 310-*b*-1 indicates a Node Version setting.

In some examples, if the setting of the first update version field 310-*b*-1 conflicts with the setting of the first update version field of the earlier configuration, then the setting of the earlier configuration may override the setting of the first update version field 310-*b*-1. By overriding the setting of the first update version field 310-*b*-1 with the value of the setting in the earlier configuration, unexpected behavior during the update procedure caused by operating storage nodes using heterogenous software versions may be avoided.

As similarly described with reference to the configuration parameter fields 305-*a*, the configuration parameter fields 305-*b* may include second update version fields (such as update version field 310-*b*-2). The second update version field 310-*a*-2 may indicate that the values for the parameters indicated in a previous configuration parameter field (e.g., the third configuration parameter field 305-*a*-3 of FIG. 3A) are to be used by all of the storage nodes throughout an update procedure—e.g., if a value of the second update version field 310-*b*-2 indicates a Cluster Version setting. Alternatively, the second update version field 310-*b*-2 may indicate that the values for the parameters indicated in the third configuration parameter field 305-*b*-3 are to be used by updated storage nodes during the update procedure—e.g., if a value of the second update version field 310-*b*-2 indicates a Node Version setting.

In some examples, if the setting of the second update version field 310-*b*-2 conflicts with the setting of a corresponding second update version field of the earlier configuration, then the setting of the earlier second update version field may override the setting of the second update version field 310-*b*-2. By overriding the setting of the second update version field 310-*b*-2 with the value of the setting in the earlier second update version field, unexpected behavior during the update procedure caused by operating storage nodes using heterogenous software versions may be avoided. In some examples, by overriding the setting of the second update version field 310-*b*-2 with the value of the setting in the earlier second update version field, it may be ensured that a particular set of configuration parameters will not be operated heterogeneously—e.g., by identifying an essential set of configuration parameters and setting the corresponding second update version fields to the Cluster Version.

Figure 4:
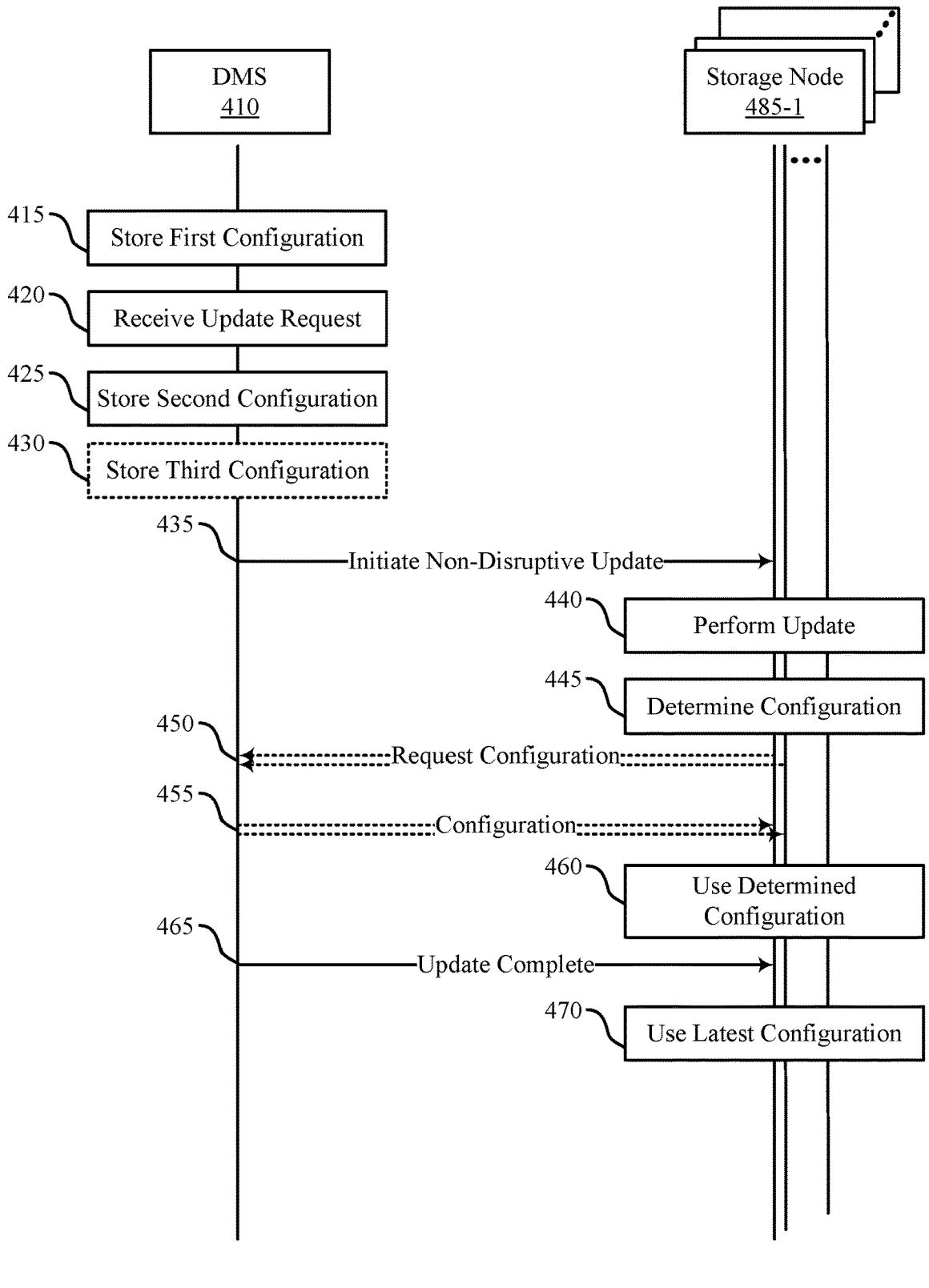
FIG. 4 illustrates an example of a set of operations that supports configuration management for non-disruptive update of a data management system in accordance with aspects of the present disclosure.

FIG. 4 shows an example of a set of operations for configuration management for non-disruptive update of a data management system in accordance with examples as disclosed herein.

The process flow 400 may be performed by the DMS 410 and the storage nodes 485, which may be respective examples of a DMS and storage nodes described herein. In some examples, the process flow 400 shows an example set of operations performed to support configuration management for non-disruptive update of a data management system. For example, the process flow 400 may include operations for providing configurations to storage nodes in a data management cluster that is being non-disruptively updated from a first software version having a first configuration to a second software version having a second configuration.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement or be combined with one or more of the operations described in the process flow 400.

At 415, a first configuration (e.g., the configuration 300-*a* of FIG. 3A) may be stored (e.g., by the DMS 410). The first configuration may be for a first software version installed on the storage nodes in a data management cluster of the DMS 410. The storage nodes may operate (e.g., provide services, perform processes, etc.) in accordance with the parameters of the first configuration.

At 420, a request to update the data management cluster from the first software version to a second software version may be received (e.g., at the DMS 410). The second software version may include a file for installing the second software version on the storage nodes of the data management cluster. In some examples, the request further requests to update the data management cluster to a third software version—e.g., after or while the data management cluster is being updated to the second software version.

At 425, a second configuration may be stored (e.g., by the DMS 410). The second configuration may be for a second software version to be installed on the storage nodes. In some examples, the second software version is to be installed on the storage nodes as part of a larger update process for updating the storage nodes to a third software version.

At 430, a third configuration may be stored (e.g., by the DMS 410). The third configuration may be for a third software version to be installed on the storage nodes.

At 435, a non-disruptive update procedure may be initiated (e.g., by the DMS 410) for the data management cluster. In some examples, a message triggering the non-disruptive update procedure includes a file for installing the update at the storage nodes. The message may also include an indication of an order in which the storage nodes are to be updated. In some examples, the message includes an indication of which configuration the storage nodes are to use during the update procedure—e.g., the first configuration or the configuration corresponding to the software version initially installed at a storage node.

At 440, the first storage node 485-1 may perform an update procedure based on the non-disruptive update being updated. In some examples, the first storage node 485-1 is the first of the storage nodes 485 to perform the update procedure. In other examples, other of the storage nodes 485 may have been updated prior to the first storage node 485-1 performing the update procedure. After performing the update procedure, the second software version may be installed on the first storage node 485-1. In some examples, the second configuration may be loaded at the first storage node 485-1 after the second software version is installed on the first storage node 485-1. In some cases, the first configuration be stored at the first storage node 485-1 after the second software version is installed on the first storage node 485-1.

At 445, a configuration to use for the first storage node 485-1 may be determined (e.g., by the first storage node 485-1)—after the second software version is installed on the first storage node 485-1. In some examples, to determine the configuration, the first storage node 485-1 may determine whether the first configuration is to be used by all of the storage nodes 485 during the update or whether the second configuration is to be used by updated nodes of the storage nodes 485 during the update. In some examples, the first storage node 485-1 determines to use the first configuration based on an update version indicator in the first configuration (and/or the second configuration) indicating that the configuration configured for the data management cluster prior to the update is to be used by all of the nodes during the update. In other examples, the first storage node 485-1 determines to use the second configuration based on an update version indicator in the first configuration (and/or the second configuration) indicating that the configuration corresponding to the software version installed at the first storage node 485-1 is to be used during the update.

In some examples, to determine the configuration, the first storage node 485-1 may determine, on an individual basis, whether configuration parameters of the first configuration or the second configuration are to be used during the update. In some examples, the first storage node 485-1 determines to use a configuration parameter of the first configuration based on an update version indicator in a corresponding configuration parameter field of the first configuration (and/or the second configuration) indicating that the version of the configuration parameter prior to the update is to be used by all of the nodes during the update. If a prior version of the configuration parameter does not exist, the first storage node 485-1 may not use the configuration parameter during the update. In other examples, the first storage node 485-1 determines to use a configuration parameter of the second configuration based on an update version indicator in a corresponding configuration parameter field of the first configuration (and/or the second configuration) indicating that the version of the configuration parameter corresponding to the software version installed at the first storage node 485-1 is to be used during the update.

In some examples, the first storage node 485-1 determines the configuration (or configuration parameters) to use during the update based on the second configuration loaded on the first storage node 485-1 after the update is completed, the first configuration stored at the first storage node 485-1 (or at the DMS 410), or both. In some cases, after determining the configuration, the first storage node 485-1 may proceed to use a first set of configuration parameters corresponding to the first configuration and a second set of configuration parameters corresponding to the second configuration during the update.

At 450, the first storage node 485-1 may request configuration information (e.g., from the DMS 410). For example, the first storage node 485-1 may request the first configuration (or configuration parameters from the first configuration) based on determining that the first configuration (or configuration parameters) are to be used during the update procedure.

At 455, configuration information may be transmitted (e.g., by the DMS 410) to the first storage node 485-1—e.g., in response to the request for configuration information. In some examples, the configuration information may include the first configuration or configuration parameters of the first configuration.

At 460, the first storage node 485-1 may proceed to operate, during the update procedure, using the determined configuration parameters. In some examples, based on using configuration parameters from the second configuration, the first storage node 485-1 may be capable of providing new services, may operate with increased efficiency, or both.

After the first storage node 485-1 is updated to the second software version, the update procedure may proceed to update other storage nodes of the storage nodes 485. In some examples, after the first storage node 485-1 is updated to the second software version, the first storage node 485-1 may be similarly updated to the third software version—e.g., before or after the other storage nodes of the storage nodes 485 have been updated to the second software version. In such cases, after the third software version is installed, the first storage node 485-1 may similarly determine whether to use configuration parameters of the first configuration, the second configuration, the third configuration, or a combination thereof, during the update procedure.

At 465, the update for the data management cluster may be completed. In some examples, the DMS 410 sends a message to the storage nodes 485 indicating that the all of the storage nodes in the data management cluster have been updated.

At 470, based on the update being completed, the storage nodes 485 may proceed to operate in accordance with the configuration corresponding to the latest software version installed on the storage nodes 485 (e.g., the second configuration or, in some examples, the third configuration).

Figure 5:
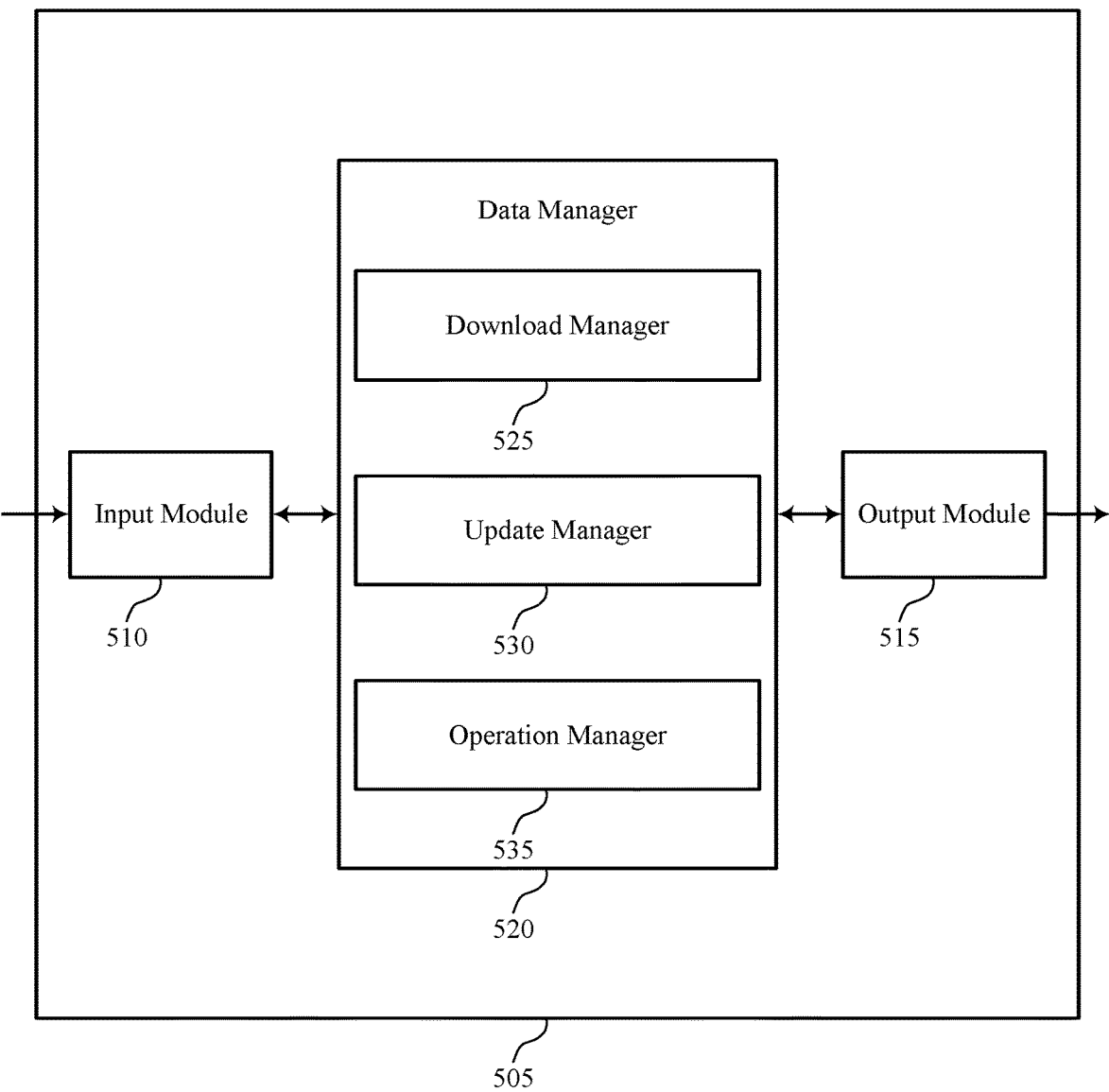
FIG. 5 shows a block diagram of an apparatus that supports configuration management for non-disruptive update of a data management system in accordance with aspects of the present disclosure.

FIG. 5 shows a block diagram 500 of a system 505 that supports configuration management for non-disruptive update of a data management system in accordance with aspects of the present disclosure. In some examples, the system 505 may be an example of aspects of one or more components described with reference to FIG. 1, such as a DMS 110. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the data manager 520 to support configuration management for non-disruptive update of a data management system. In some cases, the input interface 510 may be a component of a network interface 715 as described with reference to FIG. 7.

The output interface 515 may manage output signaling for the system 505. For example, the output interface 515 may receive signaling from other components of the system 505, such as the data manager 520, and may transmit such output signaling corresponding to (e.g., representative of or otherwise based on) such signaling to other systems or devices.

In some cases, the output interface 515 may be a component of a network interface 715 as described with reference to FIG. 7.

For example, the data manager 520 may include a download manager 525, an update manager 530, an operation manager 535, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The download manager 525 may be configured as or otherwise support a means for obtaining, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes. The update manager 530 may be configured as or otherwise support a means for performing, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes. The operation manager 535 may be configured as or otherwise support a means for operating, by the data management system during the update procedure, the data management cluster based on the first configuration, the second configuration, or both.

Figure 6:
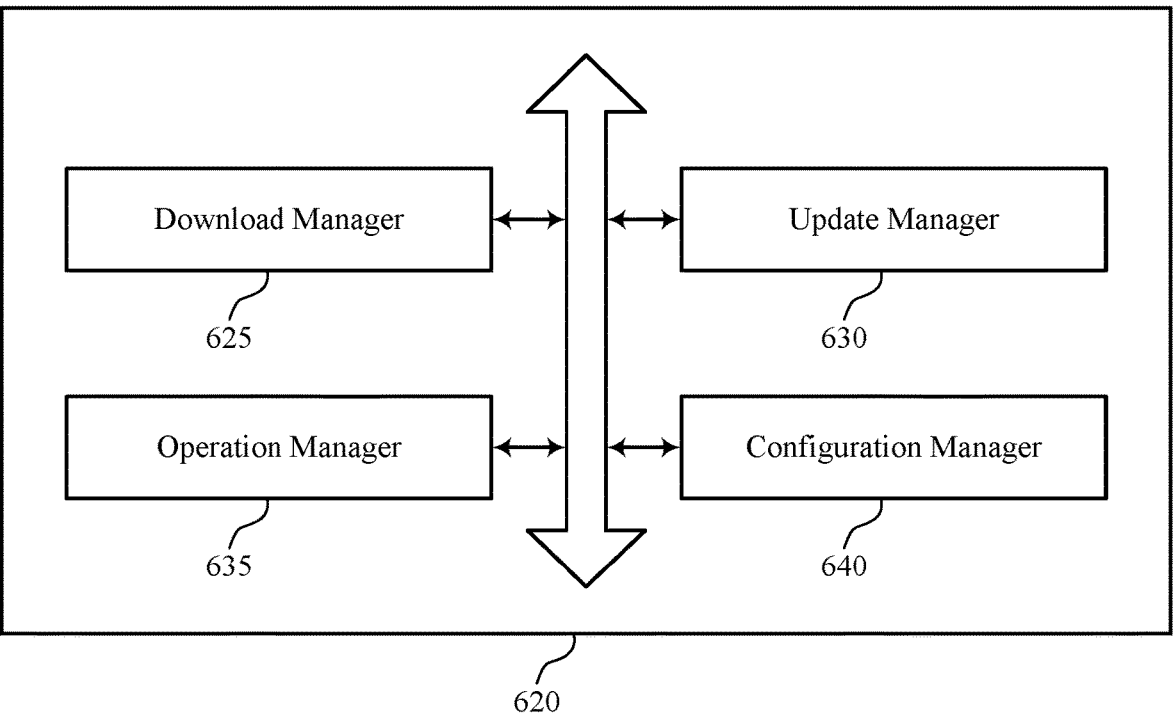
FIG. 6 shows a block diagram of a storage manager that supports configuration management for non-disruptive update of a data management system in accordance with aspects of the present disclosure.

FIG. 6 shows a block diagram 600 of a data manager 620 that supports configuration management for non-disruptive update of a data management system in accordance with aspects of the present disclosure. The data manager 620 may be an example of or include aspects of a data manager 520 as described herein. The data manager 620, or various components thereof, may be an example of means for performing various aspects of techniques for configuration management for non-disruptive update of a data management system as described herein. For example, the data manager 620 may include a download manager 625, an update manager 630, an operation manager 635, a configuration manager 640, or any combination thereof. Each of these components may communicate, directly or indirectly, with one another (e.g., via one or more buses).

The download manager 625 may be configured as or otherwise support a means for obtaining, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes. The update manager 630 may be configured as or otherwise support a means for performing, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes. The operation manager 635 may be configured as or otherwise support a means for operating, by the data management system during the update procedure, the data management cluster based on the first configuration, the second configuration, or both.

In some examples, the update manager 630 may be configured as or otherwise support a means for configuring first configuration parameters of the first configuration to be used by each storage node of the set of multiple storage nodes until the update procedure is complete.

In some examples, based on configuring the first configuration parameters to be used until the update procedure is complete, the one or more first storage nodes and the one or more second storage nodes operate using the first configuration parameters throughout the update procedure.

In some examples, the configuration manager 640 may be configured as or otherwise support a means for receiving, during the update procedure from a node of the one or more second storage nodes on which the second version is installed, a request for the first configuration parameters based on the first configuration parameters being configured to be used until the update procedure is complete. In some examples, the configuration manager 640 may be configured as or otherwise support a means for providing, during the update procedure in response to the request, the first configuration parameters to the node.

In some examples, the update manager 630 may be configured as or otherwise support a means for configuring second configuration parameters of the second configuration to be used by storage nodes of the set of multiple storage nodes that have been updated to the second version during the update procedure.

In some examples, based on configuring the second configuration parameters to be used by updated storage nodes, the one or more first storage nodes are configured to operate using first configuration parameters of the first configuration and the one or more second storage nodes are configured to operate using the second configuration parameters during a second portion of the update procedure that follows the first portion of the update procedure.

In some examples, the configuration manager 640 may be configured as or otherwise support a means for receiving, during the update procedure from a node of the one or more second storage nodes on which the second version is installed, a request for the second configuration parameters based on the second configuration parameters being configured to be used by updated storage nodes. In some examples, the configuration manager 640 may be configured as or otherwise support a means for providing, during the update procedure in response to the request, the second configuration parameters to the node.

In some examples, the configuration manager 640 may be configured as or otherwise support a means for configuring a subset of first configuration parameters of the first configuration to be used by storage nodes of the set of multiple storage nodes that have been updated to the second version during the update procedure and a subset of second configuration parameters of the second configuration to be used by the storage nodes of the set of multiple storage nodes that have been updated to the second version during the update procedure. In some examples, a subset of configuration parameters includes one or more configuration parameters.

In some examples, the configuration manager 640 may be configured as or otherwise support a means for storing, based on obtaining the information for updating the software, first configuration parameters of the first configuration and second configuration parameters of the second configuration until the update procedure is complete.

In some examples, the download manager 625 may be configured as or otherwise support a means for obtaining information for updating the software for the data management cluster from the second version to a third version associated with a third configuration for operating the set of multiple storage nodes, where after a second portion of the update procedure that follows the first portion of the update procedure has occurred, the third version is installed on at least one of the one or more second storage nodes.

In some examples, after a second portion of the update procedure that follows the first portion of the update procedure has occurred, the second version is installed on at least one of the one or more first storage nodes.

In some examples, after a completion of the update procedure, the second version is installed on each storage node of the plurality of storage nodes, and the operation manager 635 may be configured as or otherwise support a means for operating each node of the data management cluster in accordance with the second configuration after the completion of the update procedure.

In some examples, the operation manager 635 may be configured as or otherwise support a means for initializing, on at least one of the one or more second storage nodes, an application supported by the second version of the software but not the first version of the software based on operating the one or more second storage nodes in accordance with the second configuration.

In some examples, a performance metric of the data management cluster after the first portion of the update procedure is improved relative to a beginning of the update procedure as a result of the second version being installed on the one or more second storage nodes.

In some examples, the first configuration and the second configuration include common configuration parameters. In some examples, one or more values of the common configuration parameters are different.

Figure 7:
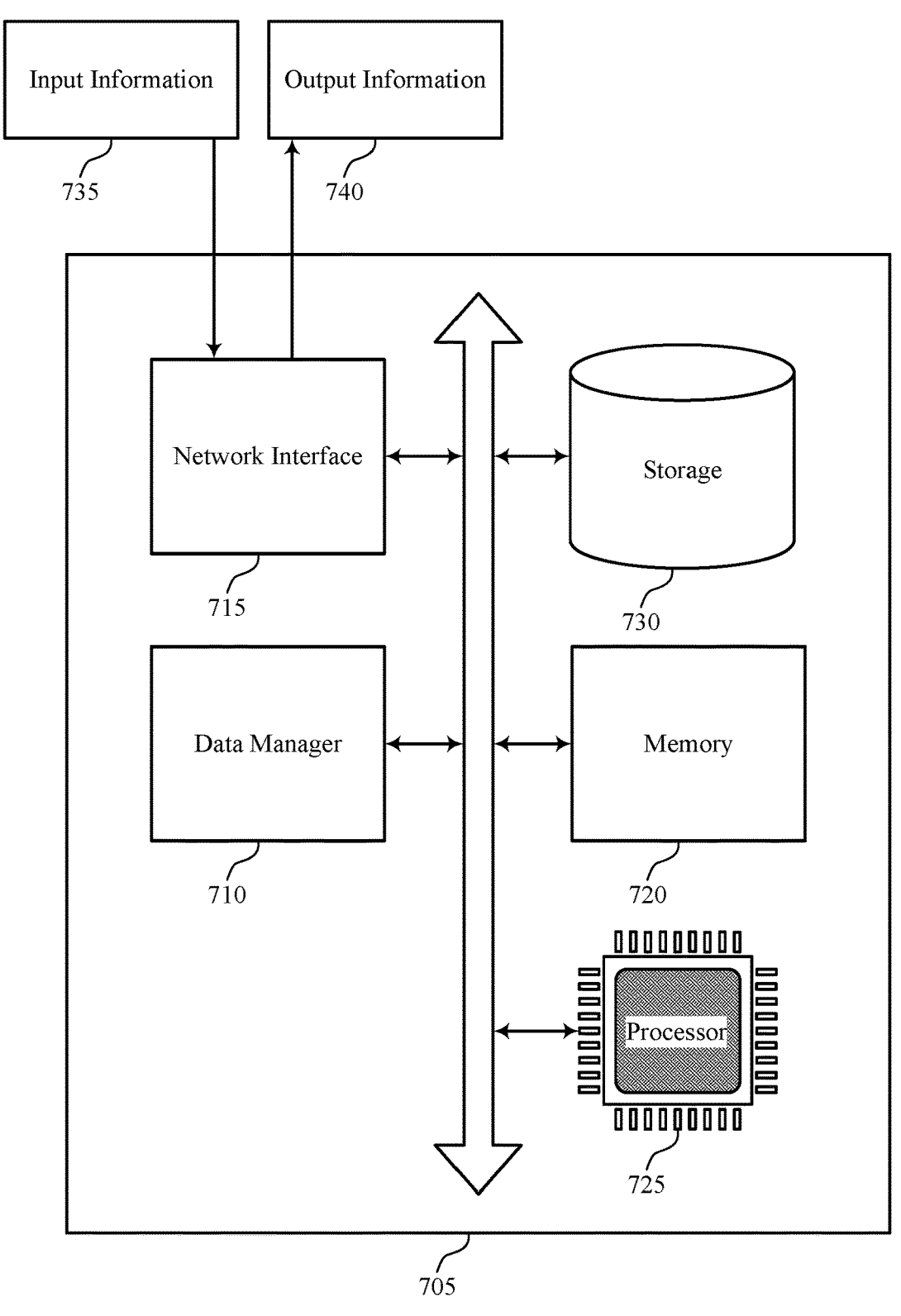
FIG. 7 shows a block diagram of a system including a device that supports configuration management for non-disruptive update of a data management system in accordance with aspects of the present disclosure.

FIG. 7 shows a block diagram 700 of a system 705 that supports configuration management for non-disruptive update of a data management system in accordance with aspects of the present disclosure. The system 705 may be an example of or include aspects of a system 505 as described herein. The system 705 may include components for data management, including components such as a data manager 710, a network interface 715, memory 720, processor 725, and storage 730. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more virtual machines). In some examples, the system 705 may be an example of aspects of one or more components described with reference to FIG. 1, such as a DMS 110.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165.

Memory 720 may include RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting configuration management for non-disruptive update of a data management system). Though, in the example of FIG. 7, a single processor (the processor 725) is depicted, it is to be understood that the system 705 and/or the processor 725 may include any quantity of processors and that a group of processors may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

The data manager 710 may be configured as or otherwise support a means for obtaining, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes. The data manager 710 may be configured as or otherwise support a means for performing, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes. The data manager 710 may be configured as or otherwise support a means for operating, by the data management system during the update procedure, the data management cluster based on the first configuration, the second configuration, or both.

FIG. 8 shows a flowchart illustrating a method 800 that supports techniques for configuration management for non-disruptive update of a data management system in accordance with aspects of the present disclosure. The operations of the method 800 may be implemented by a system or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include obtaining, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes. The operations of 805 may be performed in accordance with examples as disclosed herein. In some examples, aspects of the operations of 805 may be performed by a download manager 625 as described with reference to FIG. 6.

At 810, the method may include performing, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes. The operations of 810 may be performed in accordance with examples as disclosed herein. In some examples, aspects of the operations of 810 may be performed by an update manager 630 as described with reference to FIG. 6.

At 815, the method may include operating, by the data management system during the update procedure, the data management cluster based on the first configuration, the second configuration, or both. The operations of 815 may be performed in accordance with examples as disclosed herein. In some examples, aspects of the operations of 815 may be performed by an operation manager 635 as described with reference to FIG. 6.

A method is described. The method may include obtaining, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes, performing, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes, and operating, by the data management system during the update procedure, the data management cluster based on the first configuration, the second configuration, or both.

An apparatus is described. The apparatus may include a processor, memory coupled with the processor, and instructions stored in the memory. The instructions may be executable by the processor to cause the apparatus to obtain, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes, perform, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes, and operate, by the data management system during the update procedure, the data management cluster based on the first configuration, the second configuration, or both.

Another apparatus is described. The apparatus may include means for obtaining, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes, means for performing, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes, and means for operating, by the data management system during the update procedure, the data management cluster based on the first configuration, the second configuration, or both.

A non-transitory computer-readable medium storing code is described. The code may include instructions executable by a processor to obtain, by a data management system, information for updating software for a data management cluster from a first version to a second version, the data management cluster including a set of multiple storage nodes, where the first version is associated with a first configuration for operating the set of multiple storage nodes and the second version is associated with a second configuration for operating the set of multiple storage nodes, perform, by the data management system and using the information, an update procedure for the data management cluster, where, after a first portion of the update procedure has occurred, the first version is installed on one or more first storage nodes of the set of multiple storage nodes and the second version is installed on one or more second storage nodes of the set of multiple storage nodes, and operate, by the data management system during the update procedure, the data management cluster based on the first configuration, the second configuration, or both.

Some examples of the method, apparatuses, and non-transitory computer-readable medium described herein may further include operations, features, means, or instructions for configuring first configuration parameters of the first configuration to be used by each storage node of the set of multiple storage nodes until the update procedure may be complete.

In some examples of the method, apparatuses, and non-transitory computer-readable medium described herein, based on configuring the first configuration parameters to be used until the update procedure may be complete, the one or more first storage nodes and the one or more second storage nodes operate using the first configuration parameters throughout the update procedure.

Some examples of the method, apparatuses, and non-transitory computer-readable medium described herein may further include operations, features, means, or instructions for receiving, during the update procedure from a node of the one or more second storage nodes on which the second version may be installed, a request for the first configuration parameters based on the first configuration parameters being configured to be used until the update procedure may be complete and providing, during the update procedure in response to the request, the first configuration parameters to the node.

Some examples of the method, apparatuses, and non-transitory computer-readable medium described herein may further include operations, features, means, or instructions for configuring second configuration parameters of the second configuration to be used by storage nodes of the set of multiple storage nodes that may have been updated to the second version during the update procedure.

In some examples of the method, apparatuses, and non-transitory computer-readable medium described herein, based on configuring the second configuration parameters to be used by updated storage nodes, the one or more first storage nodes may be configured to operate using first configuration parameters of the first configuration and the one or more second storage nodes may be configured to operate using the second configuration parameters during a second portion of the update procedure that follows the first portion of the update procedure.

Some examples of the method, apparatuses, and non-transitory computer-readable medium described herein may further include operations, features, means, or instructions for receiving, during the update procedure from a node of the one or more second storage nodes on which the second version may be installed, a request for the second configuration parameters based on the second configuration parameters being configured to be used by updated storage nodes and providing, during the update procedure in response to the request, the second configuration parameters to the node.

Some examples of the method, apparatuses, and non-transitory computer-readable medium described herein may further include operations, features, means, or instructions for configuring a subset of first configuration parameters of the first configuration to be used by storage nodes of the set of multiple storage nodes that may have been updated to the second version during the update procedure and a subset of second configuration parameters of the second configuration to be used by the storage nodes of the set of multiple storage nodes that may have been updated to the second version during the update procedure.

Some examples of the method, apparatuses, and non-transitory computer-readable medium described herein may further include operations, features, means, or instructions for storing, based on obtaining the information for updating the software, first configuration parameters of the first configuration and second configuration parameters of the second configuration until the update procedure may be complete.

Some examples of the method, apparatuses, and non-transitory computer-readable medium described herein may further include operations, features, means, or instructions for obtaining information for updating the software for the data management cluster from the second version to a third version associated with a third configuration for operating the set of multiple storage nodes, where after a second portion of the update procedure that follows the first portion of the update procedure may have occurred, the third version may be installed on at least one of the one or more second storage nodes.

In some examples of the method, apparatuses, and non-transitory computer-readable medium described herein, after a second portion of the update procedure that follows the first portion of the update procedure may have occurred, the second version may be installed on at least one of the one or more first storage nodes.

In some examples of the method, apparatuses, and non-transitory computer-readable medium described herein, and the method, apparatuses, and non-transitory computer-readable medium may include further operations, features, means, or instructions for, after a completion of the update procedure, the second version is installed on each storage node of the plurality of storage nodes, operating each node of the data management cluster in accordance with the second configuration after the completion of the update procedure.

Some examples of the method, apparatuses, and non-transitory computer-readable medium described herein may further include operations, features, means, or instructions for initializing, on at least one of the one or more second storage nodes, an application supported by the second version of the software but not the first version of the software based on operating the one or more second storage nodes in accordance with the second configuration.

In some examples of the method, apparatuses, and non-transitory computer-readable medium described herein, a performance metric of the data management cluster after the first portion of the update procedure may be improved relative to a beginning of the update procedure as a result of the second version being installed on the one or more second storage nodes.

In some examples of the method, apparatuses, and non-transitory computer-readable medium described herein, the first configuration and the second configuration include common configuration parameters and one or more values of the common configuration parameters may be different.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various com-ponents of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

obtaining, by a data management system, information for updating software for a data management cluster from a first version to a second version, the data management cluster comprising a plurality of storage nodes, wherein the first version is associated with a first set of configuration parameters for operating the plurality of storage nodes and the second version is associated with a second set of configuration parameters for operating the plurality of storage nodes, the first set of configuration parameters indicating a first set of values associated with one or more settings of the first version of the software, one or more settings of one or more services supported by the first version of the software, or both, and the second set of configuration parameters indicating a second set of values associated with one or more settings of the second version of the software, one or more settings of one or more services supported by the second version of the software, or both;

performing, by the data management system and using the information, an update procedure for the data management cluster, wherein, after a first portion of the update procedure has occurred, the first version is installed on one or more first storage nodes of the plurality of storage nodes and the second version is installed on one or more second storage nodes of the plurality of storage nodes; and operating, by the data management system, the data management cluster during the update procedure, wherein the one or more first storage nodes operate using the first version of the software and the first set of configuration parameters while the one or more second storage nodes concurrently operate using:

the second version of the software, a first subset of the first set of configuration parameters instead of first corresponding configuration parameters included in the second set of configuration parameters, wherein using the first subset of the first set of configuration parameters is based at least in part on the first subset of the first set of configuration parameters being associated with respective indications that non-updated configurations are to be used for the first subset of the first set of configuration parameters during the update procedure, and a second subset of the second set of configuration parameters instead of second corresponding configuration parameters included in the first set of configuration parameters, wherein using the second subset of the second set of configuration parameters is based at least in part on the second subset of the second set of configuration parameters being associated with respective indications that updated configurations are to be used for the second subset of the second set of configuration parameters during the update procedure.

2. The method of claim 1, further comprising:

configuring the first subset of the first set of configuration parameters to be used by storage nodes of the plurality of storage nodes that have been updated to the second version during the update procedure and the second subset of the second set of configuration parameters to be used by the storage nodes of the plurality of storage nodes that have been updated to the second version during the update procedure, wherein the respective indications that non-updated configurations are to be used for the first subset of the first set of configuration parameters and the respective indications that updated configurations are to be used for the second subset of the second set of configuration parameters are based at least in part on the configuring.

3. The method of claim 1, further comprising:

storing, based at least in part on obtaining the information for updating the software, the first set of configuration parameters and the second set of configuration parameters until the update procedure is complete.

4. The method of claim 1, further comprising:

obtaining second information for updating the software for the data management cluster from the second version to a third version associated with a third configuration for operating the plurality of storage nodes, wherein after a second portion of the update procedure that follows the first portion of the update procedure has occurred, the third version is installed on at least one of the one or more second storage nodes.

5. The method of claim 1, wherein after a second portion of the update procedure that follows the first portion of the update procedure has occurred, the second version is installed on at least one of the one or more first storage nodes.

6. The method of claim 1, wherein:

after a completion of the update procedure, the second version is installed on each storage node of the plurality of storage nodes, and the method further comprises operating each node of the data management cluster in accordance with the second set of configuration parameters after the completion of the update procedure.

7. The method of claim 1, further comprising:

initializing, on at least one of one or more third storage nodes, an application supported by the second version of the software but not the first version of the software based at least in part on operating the one or more third storage nodes in accordance with the second set of configuration parameters.

8. The method of claim 1, wherein a performance metric of the data management cluster after the first portion of the update procedure is improved relative to a beginning of the update procedure as a result of the second version being installed on the one or more second storage nodes.

9. The method of claim 1, wherein the first set of configuration parameters and the second set of configuration parameters comprise common configuration parameters, and wherein one or more values of the common configuration parameters are different.

10. An apparatus, comprising:

at least one processor; and memory storing instructions that are executable by the at least one processor to cause the apparatus to:

obtain information for updating software for a data management cluster from a first version to a second version, the data management cluster comprising a plurality of storage nodes, wherein the first version is associated with a first set of configuration parameters for operating the plurality of storage nodes and the second version is associated with a second set of configuration parameters for operating the plurality of storage nodes, the first set of configuration parameters indicating a first set of values associated with one or more settings of the first version of the software, one or more settings of one or more services supported by the first version of the software, or both, and the second set of configuration parameters indicating a second set of values associated with one or more settings of the second version of the software, one or more settings of one or more services supported by the second version of the software, or both;

perform, using the information, an update procedure for the data management cluster, wherein, after a first portion of the update procedure has occurred, the first version is installed on one or more first storage nodes of the plurality of storage nodes and the second version is installed on one or more second storage nodes of the plurality of storage nodes; and operate the data management cluster during the update procedure, wherein the one or more first storage nodes operate using the first version of the software and the first set of configuration parameters while the one or more second storage nodes concurrently operate using:

the second version of the software, a first subset of the first set of configuration parameters instead of first corresponding configuration parameters included in the second set of configuration parameters, wherein using the first subset of the first set of configuration parameters is based at least in part on the first subset of the first set of configuration parameters being associated with respective indications that non-updated configurations are to be used for the first subset of the first set of configuration parameters during the update procedure, and a second subset of the second set of configuration parameters instead of second corresponding configuration parameters included in the first set of configuration parameters, wherein using the second subset of the second set of configuration parameters is based at least in part on the second subset of the second set of configuration parameters being associated with respective indications that updated configurations are to be used for the second subset of the second set of configuration parameters during the update procedure.

11. The apparatus of claim 10, wherein the instructions are executable by the at least one processor to further cause the apparatus to:

configure the first subset of the first set of configuration parameters to be used by storage nodes of the plurality of storage nodes that have been updated to the second version during the update procedure and the second subset of the second set of configuration parameters to be used by the storage nodes of the plurality of storage nodes that have been updated to the second version during the update procedure, wherein the respective indications that non-updated configurations are to be used for the first subset of the first set of configuration parameters and the respective indications that updated configurations are to be used for the second subset of the second set of configuration parameters are based at least in part on the configuring.

12. The apparatus of claim 10, wherein the instructions are executable by the at least one processor to further cause the apparatus to:

store, based at least in part on obtaining the information for updating the software, the first set of configuration parameters and the second set of configuration parameters until the update procedure is complete.

13. The apparatus of claim 10, wherein the instructions are executable by the at least one processor to further cause the apparatus to:

obtain second information for updating the software for the data management cluster from the second version to a third version associated with a third configuration for operating the plurality of storage nodes, wherein after a second portion of the update procedure that follows the first portion of the update procedure has occurred, the third version is installed on at least one of the one or more second storage nodes.

14. The apparatus of claim 10, wherein, after a second portion of the update procedure that follows the first portion of the update procedure has occurred, the second version is installed on at least one of the one or more first storage nodes.

15. The apparatus of claim 10, wherein:

after a completion of the update procedure, the second version is installed on each storage node of the plurality of storage nodes, and the instructions are executable by the at least one processor to further cause the apparatus to operate each node of the data management cluster in accordance with the second set of configuration parameters after the completion of the update procedure.

16. The apparatus of claim 10, wherein the instructions are executable by the at least one processor to further cause the apparatus to:

initialize, on at least one of one or more third storage nodes, an application supported by the second version of the software but not the first version of the software based at least in part on operating the one or more third storage nodes in accordance with the second set of configuration parameters.

17. The apparatus of claim 10, wherein a performance metric of the data management cluster after the first portion of the update procedure is improved relative to a beginning of the update procedure as a result of the second version being installed on the one or more second storage nodes.

18. The apparatus of claim 10, wherein the first set of configuration parameters and the second set of configuration parameters comprise common configuration parameters, and wherein one or more values of the common configuration parameters are different.

19. A non-transitory, computer-readable medium, comprising:

code that comprises instructions that, when executed by at least one processor of a device, cause the device to:

obtain information for updating software for a data management cluster from a first version to a second version, the data management cluster comprising a plurality of storage nodes, wherein the first version is associated with a first set of configuration parameters for operating the plurality of storage nodes and the second version is associated with a second set of configuration parameters for operating the plurality of storage nodes, the first set of configuration parameters indicating a first set of values associated with one or more settings of the first version of the software, one or more settings of one or more services supported by the first version of the software, or both, and the second set of configuration parameters indicating a second set of values associated with one or more settings of the second version of the software, one or more settings of one or more services supported by the second version of the software, or both;

perform, using the information, an update procedure for the data management cluster, wherein, after a first portion of the update procedure has occurred, the first version is installed on one or more first storage nodes of the plurality of storage nodes and the second version is installed on one or more second storage nodes of the plurality of storage nodes; and operate the data management cluster during the update procedure, wherein the one or more first storage nodes operate using the first version of the software and the first set of configuration parameters while the one or more second storage nodes concurrently operate using:

the second version of the software, a first subset of the first set of configuration parameters instead of first corresponding configuration parameters included in the second set of configuration parameters, wherein using the first subset of the first set of configuration parameters is based at least in part on the first subset of the first set of configuration parameters being associated with respective indications that non-updated configurations are to be used for the first subset of the first set of configuration parameters during the update procedure, and a second subset of the second set of configuration parameters instead of second corresponding configuration parameters included in the first set of configuration parameters, wherein using the second subset of the second set of configuration parameters is based at least in part on the second subset of the second set of configuration parameters being associated with respective indications that updated configurations are to be used for the second subset of the second set of configuration parameters during the update procedure.

20. The non-transitory, computer-readable medium of claim 19, wherein the instructions, when executed by the at least one processor of the device, further cause the device to:

store, based at least in part on obtaining the information for updating the software, the first set of configuration parameters and the second set of configuration parameters until the update procedure is complete.

* * * * *